United States Patent [19]

White

[11] Patent Number: 5,684,563
[45] Date of Patent: Nov. 4, 1997

[54] CREATING AN IMAGE AS PERCEIVED BY A PERSON WITH COLOR-DEFICIENT VISION

[76] Inventor: Brian White, 101 Theresa Dr., Coeur d'Alene, Id. 83814

[21] Appl. No.: 560,092

[22] Filed: Nov. 17, 1995

Related U.S. Application Data

[63] Continuation-in-part of Ser. No. 93,895, Jul. 20, 1993, abandoned, which is a continuation of Ser. No. 835,889, Feb. 14, 1992, abandoned.

[51] Int. Cl.$^6$ ............................ G03B 27/32; G03B 27/52
[52] U.S. Cl. .................... 355/32; 355/32; 355/71; 355/44; 355/67
[58] Field of Search ..................... 355/32, 71, 44, 355/67; 358/512

[56] References Cited

U.S. PATENT DOCUMENTS

| | | | |
|---|---|---|---|
| 2,641,853 | 6/1953 | Helding | 35/28.3 |
| 3,536,402 | 10/1970 | Aston | 355/35 |
| 5,044,730 | 9/1991 | LaDuke et al. | 359/890 |
| 5,541,735 | 7/1996 | Rengle | 356/402 |

*Primary Examiner*—Arthur T. Grimley
*Assistant Examiner*—Shival Virmani
*Attorney, Agent, or Firm*—Glenna Hendricks; Stephen Gates

[57] ABSTRACT

A method of processing color photographs to render the final image such that it will portray to an individual of normal color vision the image as it actually appears to the individual with color-deficient vision is described.

4 Claims, 2 Drawing Sheets

CREATING AN IMAGE AS PERCEIVED BY A PERSON WITH COLOR-DEFICIENT VISION

This application is a continuation-in-part of U.S. Ser. No. 08/093,895 filed Jul. 20, 1993, now abandoned, which is a continuation of U.S. Ser. No. 07/835,889, filed Feb. 14, 1992, now abandoned.

BACKGROUND OF THE INVENTION

Many individuals and animals have color deficient vision. Color deficiency in humans often results from lack of one of three cones in the retina of the eye that are essential for full color vision. By far the most common forms of color deficiency are deuteranopia (lack of the green cone) and protanopia (lack of the red cone). The practical consequence of deuteranopia is that the individual is able to identify blue, but is incapable of differentiating green, yellow, orange, and red (GYOR). Protanopes, in addition, see reds only dimly. In such color-blind humans, green, yellow, orange, and red are all perceived as yellow or grey. However, when the color actually viewed is yellow, the yellow appears brighter than the perceived "yellow" that is seen in place of red or green. Thus, these individuals see the colored world in shades of yellow and blue. Color blindness is far more common in males than in females. Since people of normal vision substantially outnumber those with color deficiency, it is inevitable that those of normal color vision will design and construct most of the objects intended for viewing and use by individuals in the population as a whole. In some cases, this badly handicaps the color deficient since objects such as traffic and other informational signs and devices, advertisements, and art may be perceived very differently than the designers intended.

Educational materials for the young are designed to elicit maximum interest from the child. Toys, books for beginning readers, furniture, and classroom design are all produced with attention to the impact on the child who has normal vision. The perceptions of the color-blind child are usually not considered in the design of materials for early childhood education. The elementary school teacher is usually a female and is, therefore, less likely to be color deficient. The teacher does not, at present, have a capacity to see the educational materials as perceived by the color-blind child. It would be quite instructive to a teacher if he/she could see the book or picture through the eyes of the color-blind child. In addition, it would be useful to producers of educational materials if they could envision that which is "seen" by the color-deficient individual.

It is currently believed that the normal eyesight of certain domestic and wild animals shares the color perception of color-blind humans. The ability to view a scene as it would be perceived by an animal would be helpful in design of clothing and gear for hunters or photographers of wild life.

SUMMARY OF THE INVENTION

It is the purpose of this invention to provide color substituted photographs developed from colored photographs that would simulate the image seen by the color deficient individual. The processes of the invention provide means for producing the simulated color-blind image from a properly exposed color photograph, transparency, or negative. The invention may be practiced using techniques of color separation photography. The method of color separation practiced is not important so long as the image produced replicates the image as perceived by the color-deficient individual. For deuterinopes, for example, that implies that green, yellow, orange and red are shades of yellow in the final photograph wherein the perceived "yellow" that represents the ends of the GYOR range is more subdued than the true yellow, while blue is retained in the final simulated color deficient photo. (The photos produced thereby will often be referred to as GYOR/BLUE photographs in this application.)

DETAILED DESCRIPTION OF THE INVENTION

Figure 1:
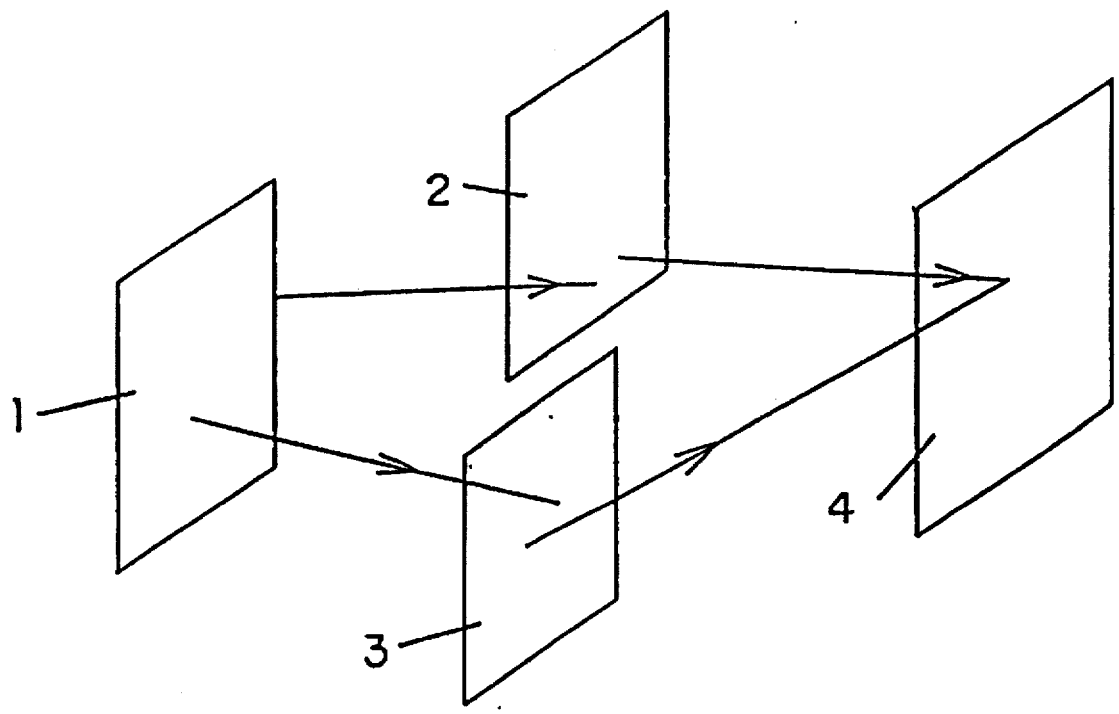
FIG. 1 is a view of a general flow path for preparing images of the invention.

The images of the invention provide means for designers who possess normal vision to evaluate the effect of their products on the color deficient individual so that designs may be developed that will address the needs of the color deficient. Scientists and technicians who deal with color deficiency have previously identified and described the patterns of color confusion and perception of the color deficient. However, the method of the invention makes it possible for the designer to actually see the effect of the color deficiency on the viewer.

In order to simulate color deficient vision in photographs, prints, video, or other final visual presentations, color must be substituted for some of the colors that are evident to individual of normal vision. The substituted color must also display the same brightness distribution that is recorded by the cone-deficient eye. Thus, for the case of absence of the green cone, known as deuteranopia (the most common form of color blindness), yellow is substituted for green, orange, and red light. Yellow requires no substitution, but appears as "true" yellow. However, the yellow that is substituted for green and red must be diminished in brightness compared to the true yellow, so that the substituted color is not as bright as true yellow. Yellow that is substituted for orange needs to be less subdued in relative brightness than yellow that is substituted for green or red.

Simulation of the other forms of color deficient vision can be handled somewhat similarly. For individual who lacks the red cone (Proteranopia, the second most common form of color deficient human vision), little sensitivity exists in the red region. Red appears as black, or nearly so, to such individuals. Simulation of proteranopic eyesight requires that red light be strongly attenuated by use of a suitable filter. However, green, yellow, and orange can be handled in a manner similar to that used for simulation of deuteranopia. A filter which passes more GYOR light near the green end is appropriate.

The use of GYOR/BLUE images may be particularly important for the educational designer. Using GYOR/BLUE photos, the designer can evaluate impact on the color-blind child (usually male) of the text books used in the class room. Consider, for example, that a normal child may respond more favorably to a book having particular colors. The response of the child with deficient color perception may be very different from that of the normal child. If, in evaluating the effect of educational materials on children, the educator could see what the child sees, the response of the child lacking color perception might be more readily understood. The effect of references to color in books used in early childhood education may be very confusing to these children. A review of books as depicted by the GYOR/BLUE photographs may give educators far better insight into the problems and needs of such children.

Wildlife viewers and photographers, animal trainers, hunters, and developers of equipment and camouflage fabrics can use the GYOR/BLUE photographs to see themselves and their products as color-deficient animals see them.

The images of the invention are also useful for military purposes. Because individuals who are color-blind are less likely to be deceived by camouflage that relies on color, images of the invention would be helpful for evaluating materials that are intended for use in camouflage.

Referring to FIG. 1, the method of the invention may use a colored slide, print, or negative (1) from which a blue record (2) and a GYOR record (3) are made and projected simultaneously to provide a final product (4) which may be, for example, a print, slide, or projection, wherein blue is depicted as such and the green, yellow, orange and red are all seen as yellow. The method by which the colors are transferred for this effect does not matter. For example, it is known that the wave length of light from images can be recorded and interpreted by printing devices to create colored copies of the original print to provide GYOR/BLUE prints wherein the green, yellow, orange and red wavelengths are read and then converted to yellow wavelength of appropriate brightness so that the final image created is printed in only blue and appropriate shades of yellow. (See U.S. Pat. No. 4,873,546.) The same effect can be obtained by use of filters, as seen in FIG. 2.

Figure 2:
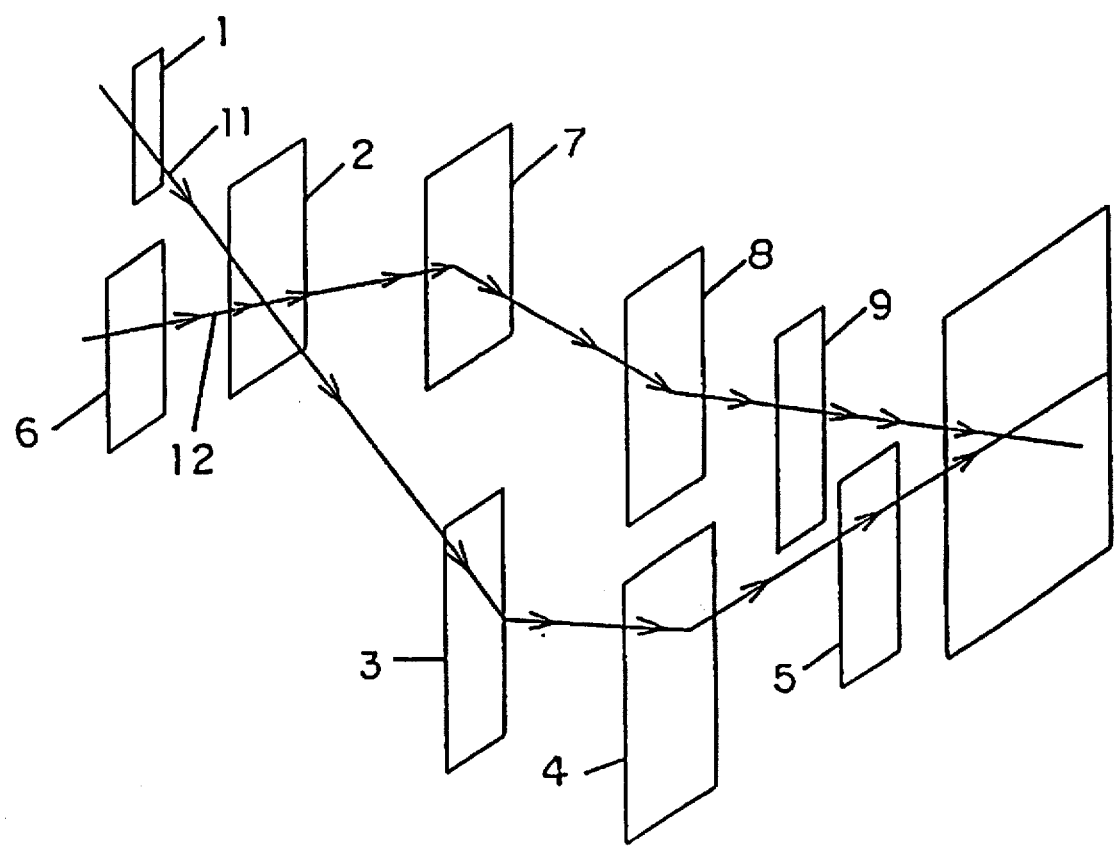
FIG. 2 depicts a flow path of light in an example of a method for producing a GYOR/BLUE photograph.

FIG. 2 depicts one method of simulating deuteranopic vision. The method starts with a color transparency (2) and produces a slide projection ((10), which displays colors as they are seen by deuteranopes. Two separate flow paths, A and B, are required to generate the final product (10).

Following Flow Path A (11): White light is passed through a blue filter (1) such as a Kodak Wratten 47B and through the original color transparency (2). An image is projected onto black and white negative film (3), which forms a blue negative record. White light is then passed through (3), and focused onto black and white negative film (4), which forms a blue positive record. (In practice, the above steps may be accomplished using the contact printing method, and panchromatic, orthochromatic, or blue sensitive film is suitable.) White light is then passed though (4) and also through a blue filter (5) such as a Kodak Wratten 47B, producing an image which is projected onto a screen (10). Flow path A has, then, resulted in isolation and separation of blue color that forms portions of the original transparency (2), which is projected onto the screen.

Following Flow Path B (12): White light is passed through an orange filter (6) such as a Kodak Wratten 16 and through the original color transparency (2). An image is projected onto black and white panchromatic film (7), which forms a GYOR negative record. White light is then passed through (7) and focused onto black and white negative film (8), which forms a GYOR positive record. In practice, these steps may be accomplished by using the contact printing method. (Panchromatic film is required for (7), but orthochromatic or blue sensitive film may be used for (8).) White light is then passed through (8) and also through a yellow filter (9) such as a Kodak Wratten 15, producing an image which is projected onto the same screen (10) as the image from Flow Path A. Flow Path B has resulted in isolation and separation of GYOR light, substitution of yellow light for GYOR that is in approximate proportion to the wave length of light "seen" by the deuteranopic eye, and that light is super-positioned onto the projection from Flow Path A.

The end result of projections from Flow Paths A and B is a projected color-substituted image (10) of the original color transparency (2). Appropriate selection of filter for the GYOR separation subdues the brightness of color-substituted yellow at the green end of the GYOR spectrum relative to true yellow, while the inherent spectral sensitivity limitation of panchromatic film subdues the brightness of substituted yellow at the red end. The image (10) approximates the appearance of (2) as it would be viewed by deuteranopes. The image (10) may be captured photographically by projecting it on a panchromatic color film or a panchromatic color paper.

A substituted image that simulates the image seen by an individual lacking the red cone (a proteranope) may be made by replacing the orange Kodak Wratten filter (FIG. 2 (6)) with a filter such as Kodak Wratten 13 that allows more light in the green spectrum to be transmitted, but blocks the light in the red spectrum.

Tritanopia, the condition caused by deficiency of the "blue" cone, and the least common form of dichroic vision, can be simulated most readily by photographing the original scene, object or image with standard color film using a filter such as Kodak Wratten 12, which blocks blue light. Greens, yellow, oranges and reds are seen in their approximate true colors. White coloration will appear "yellowish" in the simulation, due to the absence of blue.

Monochroic eyesight, which is far more rare than dichroic vision, can also be simulated using similar methods. For example, for those possessing only the blue cone, it would be sufficient to produce simulated images by photographing the original scene, object or image with a standard color film using a blue filter such as a Kodak Wratten 47B. Photographic simulation of the eyesight of individuals who posses only the "green" or "red" cone require a black and white step along with a single flow path with appropriate color substitution for GYOR (Flow Path B) colors. For those possessing only the "green" cone, a black and white negative step using a filter such as Kodak Wratten 9 or orthochromatic film is appropriate for the negative record, but panchromatic, orthochromatic, or blue sensitive film is acceptable for the "green" positive step. For individuals who possess only the "red" cone, a filter such as a Kodak Wratten 16 is necessary for the GYOR negative step, and only panchromatic black and white film is acceptable. As in previous examples, panchromatic, orthochromatic, or blue sensitive film may be used for the GYOR black and white positive. The final simulation will approximate "green-cone" or "red-cone" eyesight if colored by using an appropriate yellowish filter such as a Kodak Wratten 15.

The substituted images of the invention can be used by designers, educators, and manufacturers for many purposes. For example, color-deficient individuals may dislike clothing or furnishings because the colors they perceive are not pleasing to them. In order to adjust coloration to appeal to color-deficient individuals, it is possible, by methods disclosed herein, to make substituted images of original colored images and then design coloration for objects or pictures to stimulate and please the color-deficient person. The applications of the technology could be applied to such diverse products as wearing apparel (especially children's apparel), educational materials, fabrics and objects for home decorating, toys, books, advertising displays, dishes and motor vehicles. However, until those with normal vision can visualize the perceptions of those with deficient vision, it is not likely that designs that are developed by those with normal vision will be adapted to meet the needs of those lacking normal color vision.

What is claimed is:

1. A method of obtaining a colored image that simulates the original image as it would be perceived by a deuteranopic individual comprising the steps of exposing a color transparency to two flow paths A and B wherein in flow path A a white light is passed through a blue filter, then through a color transparency of the original image so that said light is projected onto a black and white negative film to form a blue negative record wherein said light path is then focused onto a black and white negative film to form a blue positive record, said light in said flow path A then passing through a blue filter to produce an image which is projected onto a screen, and wherein in flow path B a white light is passed through an orange filter through said original color transparency so that an image is projected onto black and white panchromatic film, and wherein light in said flow path B is then focused on a film selected from among black and white negative film, blue sensitive film, or orthochromate film, and wherein said light in said flow B is then passed through a yellow filter and thence projected on a the same screen as path A to produce one color-substituted image of said original color transparency.

2. A method of claim 1 wherein, additionally, the one color-substituted image is captured photographically by projecting said color-substituted image on a panchromatic color film or a panchromatic color paper.

3. A method of obtaining a colored image that simulates the original image as it would be perceived by a proteranopic individual comprising the steps of exposing a color transparency to two flow paths A and B wherein in Flow path A a white light is passed through a filter which blocks light in the red spectrum, then through a color transparency of the original image so that said light is projected onto a black and white negative film to form a blue negative record wherein said light path is then focused onto a black and white negative film to form a blue positive record, said light in said flow path A then passing through a blue filter to produce an image which is projected onto a screen, and wherein in flow path B a white light is passed through an orange filter through said original color transparency so that an image is projected onto black and white panchromatic film, and wherein light in said flow path B is then focused on a film selected from among black and white negative film, blue sensitive film, or orthochromate film, and wherein said light in said flow B is then passed through a yellow filter and thence projected on a the same screen as path A to produce one color-substituted image of said original color transparency.

4. A method of claim 3 wherein, additionally, the one color-substituted image is captured photographically by projecting said color-substituted image on a panchromatic color film or a panchromatic color paper.

* * * * *